United States Patent
Garg et al.

(10) Patent No.: US 11,622,245 B2
(45) Date of Patent: Apr. 4, 2023

(54) MULTI-CHANNEL CALLER ID DATABASE UPDATES

(71) Applicant: T-Mobile USA, Inc., Bellevue, WA (US)

(72) Inventors: Parag Garg, Woodinville, WA (US); Derrick Ives, North Bend, WA (US); Michele Lundahl, Yarrow Point, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/164,717

(22) Filed: Feb. 1, 2021

(65) Prior Publication Data

US 2022/0248190 A1    Aug. 4, 2022

(51) Int. Cl.
*H04W 4/16* (2009.01)
*H04M 3/42* (2006.01)

(52) U.S. Cl.
CPC ......... *H04W 4/16* (2013.01); *H04M 3/42042* (2013.01)

(58) Field of Classification Search
CPC .......................... H04W 4/16; H04M 3/42042
USPC ....................................................... 455/415
See application file for complete search history.

(56) References Cited

U.S. PATENT DOCUMENTS

| | | | |
|---|---|---|---|
| 6,421,672 B1 * | 7/2002 | McAllister | G06F 16/632 |
| 8,098,803 B1 * | 1/2012 | Croak | H04L 12/1439 |
| | | | 379/112.06 |
| 8,515,987 B1 * | 8/2013 | Jain | G06F 16/215 |
| | | | 707/769 |
| 8,601,578 B1 * | 12/2013 | Gertzenstein | G06Q 30/0259 |
| | | | 726/22 |
| 9,189,788 B1 | 11/2015 | Robinson et al. | |
| 9,432,494 B1 | 8/2016 | Kirchhoff et al. | |
| 9,699,088 B2 * | 7/2017 | Roy | H04W 8/04 |
| 9,924,044 B2 * | 3/2018 | Chen | G06Q 30/02 |
| 10,284,720 B2 * | 5/2019 | Kent | G06N 20/00 |
| 2005/0273453 A1 * | 12/2005 | Holloran | G06Q 10/10 |
| 2006/0142027 A1 * | 6/2006 | Krishnamurthi | H04M 1/72457 |
| | | | 455/457 |
| 2007/0201646 A1 * | 8/2007 | Metcalf | H04M 15/06 |
| | | | 379/142.01 |
| 2011/0313903 A1 * | 12/2011 | C. | G06Q 20/367 |
| | | | 705/34 |

(Continued)

*Primary Examiner* — Binh Kien Tieu
(74) *Attorney, Agent, or Firm* — Han Santos, PLLC

(57) ABSTRACT

A call pattern associated with a telephone number of a subscriber of a wireless carrier network is monitored. The call pattern is then analyzed via a machine-learning algorithm to classify the subscriber into a subscriber classification category of multiple subscriber classification categories. A determination is made as to whether the subscriber classification category of the subscriber corresponds to a service plan type of a specific wireless service plan subscribed to by the subscriber for the telephone number. When the subscriber classification category fails to correspond to the plan type, an offer of an additional wireless service plan that corresponds to the subscriber classification category of the subscriber is sent to a user device of the subscriber. When the subscriber classification category corresponds to the service plan type, a caller category label is assigned to the subscriber that indicates the subscriber classification category of the subscriber.

20 Claims, 8 Drawing Sheets

(56) References Cited

U.S. PATENT DOCUMENTS

| | | | |
|---|---|---|---|
| 2012/0253882 A1* | 10/2012 | Mohan | G06Q 30/0202 |
| | | | 705/7.28 |
| 2015/0111535 A1* | 4/2015 | Song | H04W 12/065 |
| | | | 455/26.1 |
| 2017/0133010 A1* | 5/2017 | Printz | G10L 15/19 |
| 2018/0324297 A1* | 11/2018 | Kent | H04Q 3/0029 |

* cited by examiner

MULTI-CHANNEL CALLER ID DATABASE UPDATES

BACKGROUND

Users of telecommunication devices receive multiple voice calls throughout the day. Caller identification (ID) is a feature that enables a user to know who a caller is before the user answers a call on a telecommunication device. For example, caller ID information may include a telephone number, a caller ID Name (often referred to by its abbreviation CNAM), and/or geographical information associated with the telephone number. Mobile network operators (MNOs) of wireless carrier networks generally obtain caller ID information from third-party vendors. However, some of the caller ID information that an MNO obtains from a third-party vendor may contain errors. As a result, an MNO may, in some instances, provide inaccurate caller ID information to its subscribers for incoming calls.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
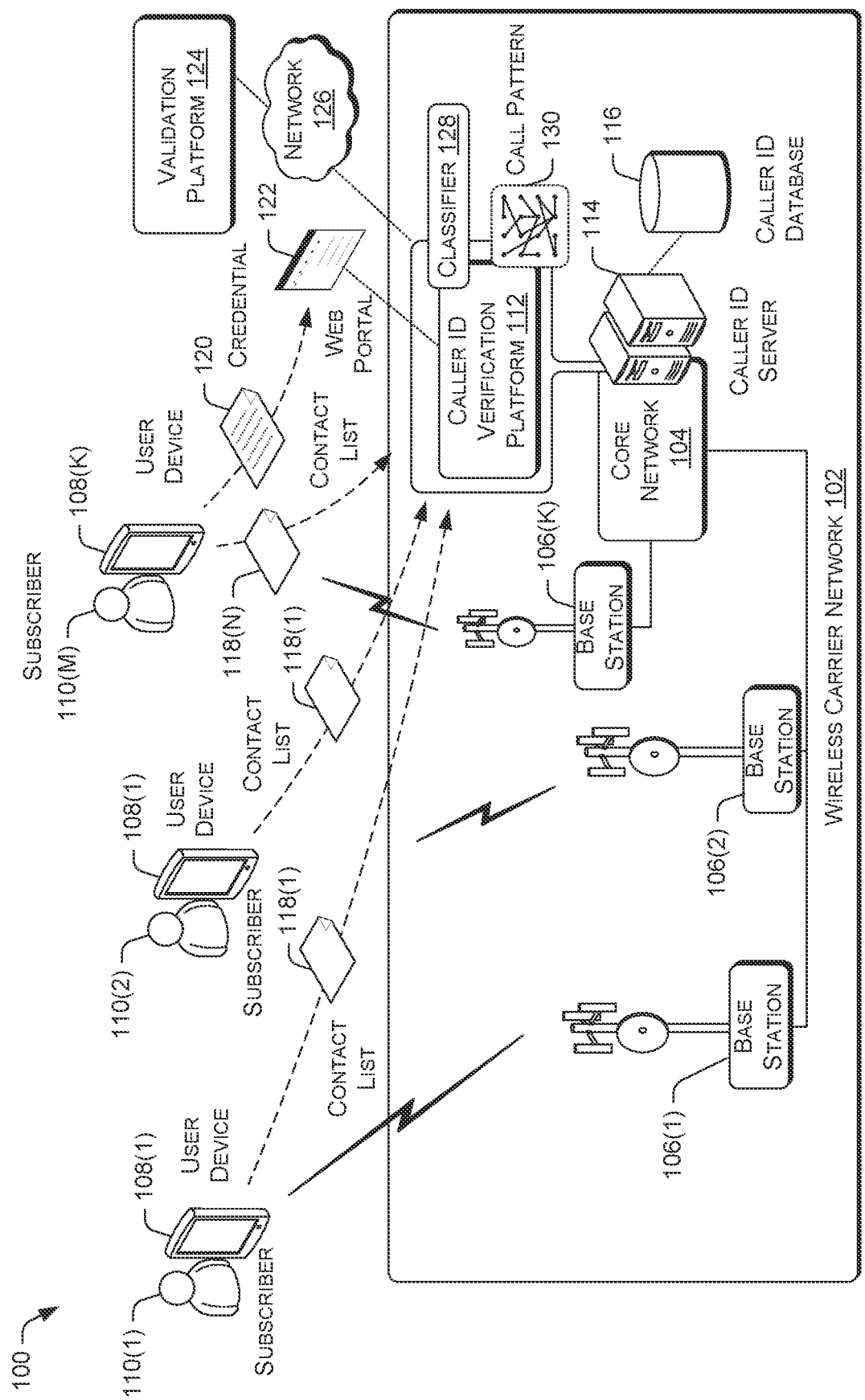
FIG. 1 illustrates an example architecture that enables a wireless carrier network to use multiple sources of information to update a caller ID database of the wireless carrier network.

This disclosure is directed to techniques that use multiple sources of information to verify the accuracy of caller identification (ID) information stored in a caller ID database of a wireless carrier network. In some embodiments, a caller ID verification platform of a wireless carrier network may collect contact lists stored on the user devices of subscribers and collate the contact name variations for each unique telephone number in the contact lists. The most frequently occurring contact name variation for each unique telephone number as collected from the contact lists is then designated as the caller ID name for the telephone number and stored in a caller ID database. In some cases, the newly designated caller ID name for a telephone number may replace an existing inaccurate caller ID name for the telephone number in the caller ID database.

In other embodiments, a subscriber may request that the wireless carrier network designate a personal or business telephone number of the subscriber as a trusted number, so that a trusted caller indicator is presented as a part of the caller ID information along with the telephone number for any calls made by the subscriber via the telephone number. Accordingly, the subscriber may submit verifying credentials to the caller ID verification platform via a web portal. For example, the credential may include a government-issued ID for a personal telephone number, or a business license for a business telephone number, in which the credential bears the corresponding identification information for authenticating the telephone number to the caller ID verification platform. In turn, the caller ID verification platform may use a third-party verification platform to verify the validity of the credential. Once the validity of a credential is verified, the caller ID verification platform may assign a trusted number status tag to the corresponding telephone number. In this way, a caller ID server of the wireless carrier network may provide a trusted caller indicator for display as a part of caller ID information. Further, since the personal or business telephone number is now verified as trusted, the caller ID verification platform may distribute the corresponding caller ID information that includes the personal or business telephone number to online social media contact directories at the request of the subscriber. Alternatively, or concurrently, the caller ID verification platform may distribute the information to other wireless carrier networks as trusted caller ID information.

In other embodiments, the caller ID verification platform may analyze a call pattern associated with a telephone number of a subscriber via a machine-learning algorithm to classify the subscriber into a subscriber classification category. For example, the subscriber classification category may be one of business caller, part-time worker caller, student caller, stay-at-home caller, etc. The caller ID verification platform may further determine whether the subscriber classification category corresponds to a service plan type of the wireless service plan associated with the telephone number. If there is a lack of correspondence, the caller ID verification platform may prompt the wireless carrier network to send an offer of a more suitable wireless service plan. For example, if a call pattern shows that a telephone number with an individual plan is used by a subscriber who is actually a business caller, the wireless carrier network may offer a business service plan to the subscriber. Additionally, the caller ID verification platform may assign a caller category label to the telephone number so that the caller category label may be displayed as a part of the caller ID information for the telephone number. For example, the caller category label may show that an incoming call that appears to be from an individual may be possibly from a business, or vice versa.

The use of multiple sources of information to verify the accuracy of caller ID information, as well as the inclusion of additional indicators and labels in the caller ID information, may help users to make a more informed choice as to whether to answer an incoming call. Such verified caller ID information may also help users to avoid answering unwanted solicitation calls or scam calls. Additionally, such verified caller ID information may also prevent some subscribers from being erroneously labeled with inaccurate information that affects their ability to reach call recipients. Thus, the use of multiple sources of information to verify caller ID information accuracy may increase overall subscriber satisfaction with an MNO that operates the wireless carrier network. The techniques described herein may be implemented in a number of ways. Example implementations are provided below with reference to the following FIGS. 1-8.

Example Architecture

FIG. 1 illustrates an example architecture that enables a wireless carrier network to use multiple sources of information to update a caller ID database of the wireless carrier network. The wireless carrier network 102 may provide a wide range of mobile communication services, as well as ancillary services and features, to subscribers and associated mobile device users. The wireless carrier network 102 may be operated by a mobile network operator (MNO). In various embodiments, the wireless carrier network 102 may provide wireless communication between multiple user devices. Further, the wireless carrier network 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network 104 by a wide area network (WAN). Each regional portion of the wireless carrier network 102 may include one or more RANs and a regional circuit and/or packet-switched network and associated signaling network facilities. The wireless carrier network 102 may provide telecommunication services in accordance with one or more technical standards, such as Enhanced Data Rates for GSM Evolution (EDGE), Wideband Code Division Multiple Access (W-CDMA), High-Speed Packet Access (HSPA), Long Term Evolution (LTE), CDMA-2000 (Code Division Multiple Access 2000), 5th Generation (5G), and/or so forth.

A RAN of the wireless carrier network 102 may include a number of base stations, such as the base stations 106(1)-106(K), also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network 104. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. The core network 104 may connect to a public packet data communication network, such as the Internet. Data and voice communications via the RANs, the core network, and the Internet may support a variety of telecommunication services through the wireless carrier network 102.

The wireless carrier network 102 may provide telecommunication services to multiple user devices. In some instances, the user devices may include smartphones, tablet computers, embedded computer systems, or any other device that is capable of using the wireless communication services that are provided by the wireless carrier network 102. For example, the wireless carrier network 102 may provide telecommunication services to user devices 108(1)-108(K) of the subscribers 110(1)-110(M).

The backend servers of the core network 104 may execute a caller ID verification platform 112. For example, the caller ID verification platform 112 may be executed by one or more caller ID servers, such as the caller ID server 114, of the core network 104. The caller ID server 114 may be further responsible for retrieving caller ID information from a caller ID database 116 for an incoming call destined for a subscriber of the wireless carrier network 102 and providing the caller ID information to a recipient user device of the subscriber, such that the caller ID information may be displayed by the recipient user device with an incoming call notification.

In some embodiments, the caller ID verification platform 112 may collect contact lists stored on the user devices of subscribers, such as the contact lists 118(1)-118(N) that are stored in the user device 108(1)-108(K). For example, the caller ID verification platform 112 may collect the contact lists from a large sample size of user devices (e.g., hundreds of thousands of user devices) whose corresponding subscribers have consented to the data collection. The caller ID verification platform 112 may collate and store the contact name variations for each unique telephone number that are found in the contact lists. For example, a telephone number may be designated in a first contact list as being associated with a contact name variation of "Jennifer Edwards", in a second contact list as being associated with a contact name variation of "Jenny Edwards", and in a third contact list as being associated with a contact name variation of "J. Edwards". Other contact name variations from other contact lists may include "Jenny", "Jen", "Mom", "Sis", "Jennifer E.", and so on and so forth.

The most frequently occurring contact name variation for each unique telephone number as collected from the contact lists is then designated by the caller ID verification platform 112 as the caller ID name for the corresponding telephone number and stored in the caller ID database 116. In some cases, the newly designated caller ID name for a telephone number may replace an existing inaccurate caller ID name for the telephone number in the caller ID database 116. The caller ID server 114 may provide the newly designated caller ID name as part of the caller ID information for an incoming call that is initiated from a user device via the corresponding telephone number.

In some instances, the caller ID verification platform 112 may designate a most frequently occurring contact name variation for a particular unique telephone as the caller ID name when the frequency of occurrence in the contact lists reaches a predetermined occurrence threshold. For example, the occurrence threshold may be a minimum percentage threshold, such as 50%, 75%, 80%, etc. of the total contact lists.

In additional embodiments, the caller ID verification platform 112 may use the collated and stored contact name variations for each unique telephone number that are found in the contact lists to ascertain telephone numbers for removal from a scam number database of the caller ID verification platform 112. The scam number database may include a collection of telephone numbers that a scam protection algorithm of the caller ID verification platform 112 has determined to be associated with scam activity. For example, the caller ID verification platform 112 may determine whether a telephone number included in the scam number database appears in a predetermined amount of the contact lists. Thus, if a particular telephone included in the scam number database appears in the predetermined amount of contact lists, the caller ID verification platform 112 may remove the particular telephone number from the scam number database.

In other embodiments, a subscriber may request that the caller ID verification platform 112 designate a personal or business telephone number of the subscriber as a trusted number. Accordingly, the caller ID server 114 may cause a trusted caller indicator to be presented as a part of the caller ID information along with the telephone number for any calls made by the subscriber via the telephone number. For example, the subscriber 110(M) may submit verifying credential 120 to the caller ID verification platform 112 via a web portal 122 of the caller ID verification platform 112. The credential 120 may be submitted for the designation of a telephone number associated with the user device 108(K) as a trusted number. For example, the credential 120 may include a government-issued ID for a personal telephone number, or a business license for a business telephone number, in which credential 120 bears the corresponding identification information for authenticating the telephone number to the caller ID verification platform 112. In turn, the caller ID verification platform 112 may use a network 126 to transmit the credential 120 to a third-party verification platform for validation of the credential. The network 126 may include the Internet, a local area network (LAN) or the wireless carrier network 102, and/or so forth. The third-party validation platform 124 may return a result of the validation to the caller ID verification platform 112. Thus, assuming that the result indicates that the credential 120 is validated, the caller ID verification platform 112 may assign a trusted number status tag to the corresponding telephone number associated with the user device 108(K) of the subscriber 110(M). In this way, the caller ID server 114 of the wireless carrier network 102 may provide a trusted caller indicator for display with incoming call notifications as a part of caller ID information. Further, since the personal or business telephone number is now verified as trusted, the caller ID verification platform 112 may distribute the corresponding caller ID information of the subscriber 110(M) that includes the personal or business telephone number to online social media contact directories at the request of the subscriber 110(M). Alternatively, or concurrently, the caller ID verification platform 112 may distribute the caller ID information of the subscriber 110(M) to other wireless carrier networks as trusted caller ID information.

In other embodiments, the caller ID verification platform 112 may analyze a call pattern associated with a telephone number of a subscriber via a machine-learning classifier 128 to classify the subscriber into a subscriber classification category. In various embodiments, the subscriber classification category may be one of business caller, part-time worker caller, student caller, stay-at-home caller, etc. For example, the subscriber 110(2) may be classified into a subscriber classification category based on a call pattern 130 of the subscriber 110(2). The call pattern 130 may include information on outgoing calls and/or incoming calls made by the subscriber 110(2) during a predetermined time period. Such information may include times and dates of the calls, call duration of the calls, the telephone numbers of the outgoing and/or incoming calls, the geographical region associated with the outgoing and/or incoming calls, and/or so forth. Following the classification of a particular subscriber into a subscriber classification category, the caller ID verification platform 112 may further determine whether the particular subscriber classification category corresponds to a service plan type of the wireless service plan associated with the telephone number. If there is a lack of correspondence, the caller ID verification platform 112 may prompt the wireless carrier network 102 (e.g., a business support system (BSS) of the wireless carrier network 102) to send an offer of a more suitable wireless service plan to the particular subscriber. For example, if a call pattern shows that a telephone number with an individual plan is used by a subscriber who is actually a business caller, the wireless carrier network 102 may offer a business service plan to the subscriber. In another example example, if a call pattern shows that a telephone number with a business plan is used by a subscriber who is actually an individual caller, the wireless carrier network 102 may offer an individual service plan to the subscriber. Additionally, the caller ID verification platform 112 may assign a caller category label to the telephone number so that the caller category label may be displayed as a part of the caller ID information for the telephone number. For example, the caller category label may show that an incoming call that appears to be from an individual may be possibly from a business, or vice versa. Further, a telephone number having a call pattern with a high volume of outgoing calls may trigger the caller ID verification platform 112 to generate a work order for customer service personnel of the wireless carrier network 102 to manually verify the identity of the caller associated with the telephone number.

Example Contextual Inference Framework

Figure 2:
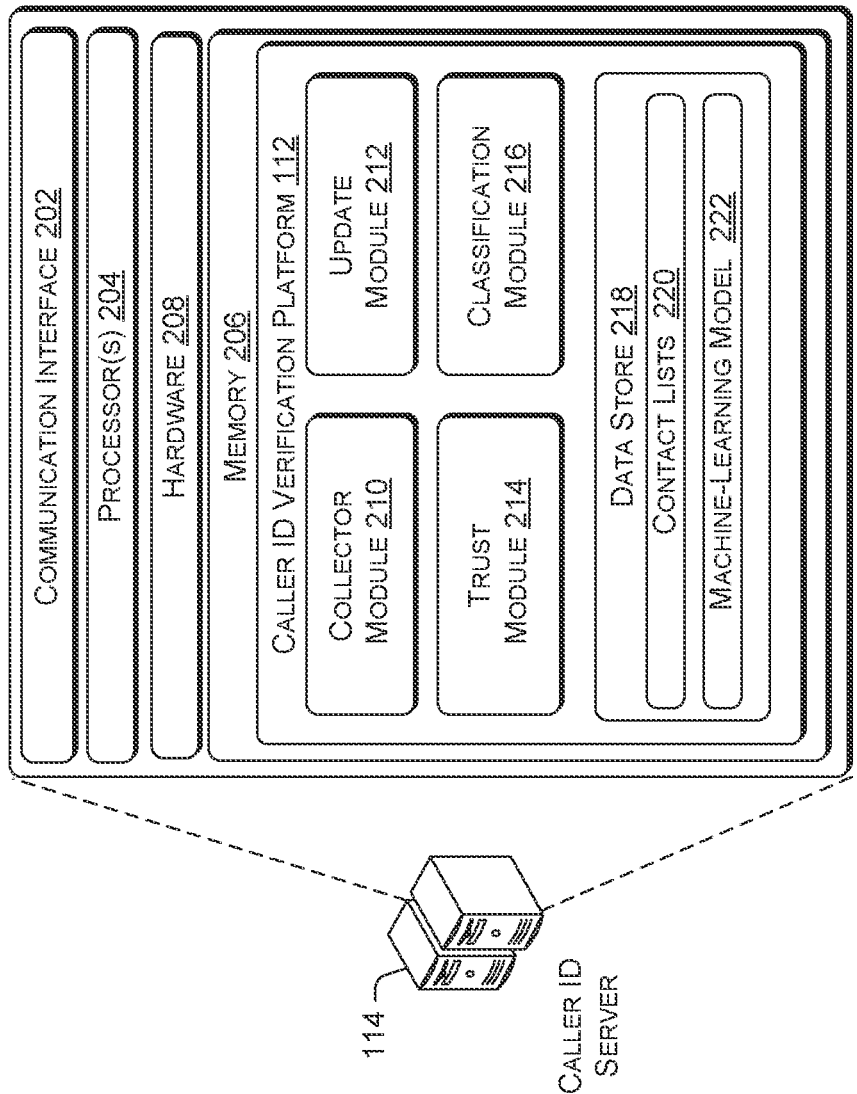
FIG. 2 is a block diagram showing various components of one or more illustrative computing devices that support a caller ID verification platform of a wireless carrier network.

FIG. 2 is a block diagram showing various components of one or more illustrative computing devices that support a caller ID verification platform of a wireless carrier network. The caller ID verification platform 112 may be implemented by one or more computing devices 200. For example, the one or more computing devices may include the caller ID server 114. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 200 or components thereof may be virtual computing devices in the form of virtual machines or software containers that are hosted in a computing cloud. The caller ID verification platform 112 may include a collector module 210, an update module 212, a trust module 214, and a classification module 216. These software components may be implemented using routines, program instructions, objects, and/or data structures that are executed by the processors 204 to perform particular tasks or implement particular abstract data types. The memory 206 may further provide a data store 218.

The collector module 210 may check for and retrieve contact lists from multiple user devices, such as the user devices 108(1)-108(K). In various embodiments, the collector module 210 may use a scheduler to check for and retrieve the contact lists from the multiple user devices. Each of the contact lists may be in the form of an address book, a telephone directory, or some other database that includes a list of names and corresponding telephone numbers. The scheduler may perform the checking and retrieval based on configurable policies. For example, a configurable policy may specify the source data location, frequency of data retrieval, data retention period, and data disposal date/time. In some embodiments, the collector module 210 may retrieve a contact list from a user device by calling an application program interface (API) of a contact list database on the user device. In other embodiments, the collector module 318 may retrieve a contact list from a user device by calling an API of a client application, e.g., an over-the-top (OTT) application that is preinstalled on the user device. The client application may be an application that is configured to retrieve the contact list from the contact list database. The contact list may be maintained by the client application or a native contact list application that is built into an operating system of the user device. The collector module 210 may employ data adapters to obtain data files from the data sources. The data adapters may use the file transfer protocol (FTP), the Hypertext Transfer Protocol (HTTP), and/or so forth to receive the data files. In some embodiments, the collector module 210 may perform data integrity tests to verify the integrity of the received data files. In some instances, the data files that are received by the collector module 210 may contain encrypted data. Accordingly, the collector module 210 may use an asymmetric or symmetric encryption algorithm to decrypt the data.

The collector module 210 may perform retrieval of a contact list from a user device of a subscriber following user consent from the subscriber to share the contact list. For example, the collector module 210 may direct the client application on a user device (e.g., the user device 108(1)) to present a consent interface to a corresponding subscriber, such as the subscriber 110(1). The consent interface may enable the subscriber to grant permission for the collector module 210 to retrieve the contact list by providing an affirmative input, such as clicking on a checkbox, tapping a consent button, moving a virtual switch from an off position to an on position, and/or so forth. Accordingly, the collector module 210 may maintain a list of device identifiers of user devices whose users have provided consent. The device identifiers may be telephone numbers (e.g., Mobile Station International Subscriber Directory Numbers (MSISDNs)), International Mobile Subscriber Identities (IMSIs), and/or some other device identifiers. The list of user identifiers is then used by the collector module 210 to activate the scheduler to periodically collect the contact lists from the corresponding user devices. The collector module 210 may store the collected contact lists, such as the contact lists 220, in the data store 218. For example, the data store 218 may include one or more databases, such as relational databases, object databases, object-relational databases, and/or key-value databases.

The update module 212 may collate and store the contact name variations for each unique telephone number that are found in the collected contact lists. The update module 212 designates the most frequently occurring contact name variation for each unique telephone number in the contact lists as the caller ID name for the corresponding telephone number. Once a particular contact name variation is designated by the update module 212 as a corresponding caller ID name for a specific telephone number, the corresponding caller ID name is stored as the caller ID name for the specific telephone number in the caller ID database 116. In some cases, the newly designated caller ID name for a specific telephone number may replace an existing inaccurate caller ID name for the specific telephone number in the caller ID database 116. In turn, the caller ID server 114 may provide the newly designated caller ID name as part of the caller ID information for an incoming call that is initiated from a user device via the corresponding telephone number. In some instances, the update module 212 may designate a most frequently occurring contact name variation for a particular unique telephone as the caller ID name when the frequency of occurrence in the contact lists reaches a predetermined occurrence threshold.

In additional embodiments, the update module 212 may use the collated and stored contact name variations for each unique telephone number that are found in the contact lists to ascertain telephone numbers for removal from a scam number database of the caller ID verification platform 112. In such embodiments, the update module 212 may determine whether a telephone number included in the scam number database appears in a predetermined amount of the contact lists. The predetermined amount may be a minimum percentage threshold (e.g., 80% of the contact lists collected from individual user devices) or a minimum numerical threshold (e.g., at least 50,000 contact lists collected from individual user devices). Thus, if a particular telephone included in the scam number database appears in the predetermined amount of contact lists, the update module 212 may remove the particular telephone number from the scam number database. This is because the appearance of the particular telephone number in the predetermined amount of contact lists may be an indication that the particular telephone number is in fact a number that is used by an ordinary subscriber for legitimate purposes. Thus, the particular telephone number may have been erroneously included in the scam number database.

The trust module 214 may receive a request from a subscriber to designate a personal or business telephone number of the subscriber as a trusted number. Once the trust module 214 designates the personal or business telephone number as a trusted number, the trust module 214 may assign a trusted number status tag to the caller ID information for the personal or business number as stored in the caller ID database 116. For example, the trust status tag may be a flag value or metadata value. In turn, the trusted number status tag may cause the caller ID server 114 to send caller ID information that includes a corresponding trust indicator symbol or value to a recipient user device. The caller ID server 114 may send the caller ID information to a user device with an incoming call notification regarding a corresponding telephone call made via the telephone number to the user device.

The trust module 214 may receive the request via a web portal, such as the web portal 122, that is provided by the caller ID verification platform 112. The web portal may include one or more web pages that enable a subscriber to submit the request and associated information. For example, the web pages may be in the form of HyperText Markup Language (HTML) documents, in which the documents may include text content, images, multimedia content, cascade style sheets (CSS), and/or scripts. The caller ID verification platform 112 may use an application server that supports server-side scripting via multiple scripting languages, such as Active Server Pages (ASP), Hypertext Preprocessor (PHP), JavaScript, and other scripting languages to support the dynamic generation of web pages based on user inputs. Accordingly, the web portal may be accessible via a web browser or a client application on a user device.

With respect to a request to designate a personal telephone number of the subscriber as a trusted number, a subscriber may initially submit a set of account login credentials via the web portal 122 to authenticate as a current subscriber of the wireless carrier network 102 to the trust module 214. For example, the subscriber 110(1) may use a web browser or a client application on the user device 108(1) to submit the request and the account login credentials. The account login credentials may include a login name, a password, biometric data, and/or so forth. The trust module 214 may use a subscriber authentication mechanism of the caller ID verification platform 112 to authenticate the user. Following the authentication of the user and the submission of the request, the web portal 122 may retrieve caller ID information from the caller ID database 116 for presentation to the subscriber via the user device. The caller ID information may include a caller ID name, a corresponding telephone number, associated geographical information, and/or so forth. The caller ID name may include a first name, a last (family) name, one or more middle names or initials, and/or so forth.

Subsequently, the web portal 122 may request a submission of a government-issued ID bearing a name that matches the caller ID name for validating the caller ID information. In various embodiments, the government-issued ID may be required to be a photo ID that includes a portrait of the subscriber, the legal name of the subscriber, a residential address of the address, a date of birth for the subscriber, an age of the subscriber, physical attributes of the subscriber (e.g., height, weight, eye color, hair color), and/or so forth. The subscriber may submit the government-issued ID by uploading a photograph, a color scan, or some other digital image of the ID to the web portal 122. In turn, the trust module 214 may use the network 126 to transmit the digital image to a third-party validation platform, such as the third-party validation platform 124. In some instances, the digital image is archived by the trust module 214 in an image database of the caller ID verification platform.

The third-party validation platform 124 may perform a validation of the digital image to determine the validity of the corresponding government-issued ID. For example, the third-party validation platform 124 may check information such as an expiration date of the ID, whether an ID identifier of the ID has been reported lost or stolen, whether the ID bears any markings that indicate the ID has been canceled, whether the digital image contains signs of tampering or alteration, whether the ID is lacking any security features, and/or so forth. In some instances, the third-party validation platform 124 may send the ID identifier of the ID to a server at a government agency for information as to whether the ID identifier has been reported as lost or stolen. Accordingly, the third-party validation platform 124 may determine that the government-issued ID is valid when none of the information checked indicates that the ID is potentially fraudulent or otherwise invalid. Subsequently, the third-party validation platform 124 may return the result of the validation to the trust module 214.

Thus, assuming that the result indicates that the government-issued ID is valid, the trust module 214 may perform a comparison of the legal name in the government-issued ID to the caller ID name retrieved for the subscriber to determine whether there is a probable match. For example, the trust module 214 may be configured to ensure that the first name and the last name in the legal name match their counterparts in the caller ID name. In some instances, the trust module 214 may be further configured to ensure that a middle initial in the caller ID name matches the middle name in the legal name, or vice versa. The trust module 214 may obtain the legal name from the digital image of the government-issued ID via optical character recognition (OCR). Once a probable match is determined, the trust module 214 may assign a trusted personal number status tag to the corresponding telephone number in the caller ID information. The trusted personal number status tag may trigger the caller ID server 114 to provide a trusted personal caller indicator to a user device for display with an incoming call notification by a recipient user device for an incoming call made via the telephone number.

In some instances, the subscriber may update the caller ID information (e.g., update a caller ID name) via the web portal 122 prior to submitting a government-issued ID. Accordingly, assuming that the result indicates that the government-issued ID is valid, the trust module 214 may perform a comparison of the legal name in the ID to the updated caller ID name submitted by the subscriber to determine whether there is a probable match. Once a probable match is determined, the trust module 214 may assign a trusted personal number status tag to the corresponding telephone number in the caller ID information.

With respect to a request to designate a business telephone number of the subscriber as a trusted number, a subscriber may initially submit a set of account login credentials via the web portal 122 to authenticate as a current subscriber of the wireless carrier network 102 to the trust module 214. The account login credentials may include a login name, a password, biometric data, and/or so forth. The trust module 214 may use a subscriber authentication mechanism of the caller ID verification platform 112 to authenticate the user. Following the authentication of the user and the submission of the request, the web portal 122 may retrieve caller ID information from the caller ID database 116 for presentation to the subscriber via the user device. The caller ID information may include a caller ID name, a corresponding telephone number, associated geographical information, and/or so forth. The caller ID name may include a business name of a business.

Subsequently, the web portal 122 may request a submission of a government-issued business paper bearing a business name that matches the caller ID name for validating the caller ID information. For example, the government-issued business paper may be a business license, a business incorporation document, or some other official corporate document.

In various embodiments, the business paper is required to include the legal business name of the business, a business address of the address, a description of the business, a document identifier, and/or so forth. The subscriber may submit the government-issued business paper by uploading a photograph, a color scan, or some other digital image of the paper to the web portal 122. In turn, the trust module 214 may use the network 126 to transmit the digital image to a third-party validation platform, such as the third-party validation platform 124. In some instances, the digital image is archived by the trust module 214 in an image database of the caller ID verification platform.

The third-party validation platform 124 may perform a validation of the digital image to determine the validity of the corresponding government-issued business paper. For example, the third-party validation platform 124 may check information such as an expiration date of the business paper, whether the business paper bears any markings that indicate the business paper has been canceled, whether the digital image contains signs of tampering or alteration, whether the business paper is lacking any security features, and/or so forth. In some instances, the third-party validation platform 124 may send the document identifier of the paper to a server at a government agency for information as to whether the business paper is valid. Accordingly, the third-party validation platform 124 may determine that the government-issued business paper is valid when none of the information checked indicates that the paper is potentially fraudulent or otherwise invalid. Subsequently, the third-party validation platform 124 may return the result of the validation to the trust module 214.

Thus, assuming that the result indicates that the government-issued business paper is valid, the trust module 214 may perform a comparison of the legal business name in the business paper to the caller ID name in the form of the business name to determine whether there is a probable match. For example, the trust module 214 may be configured to ensure that the legal business name in the business paper exactly matches its counterpart in the caller ID name. In other instances, the trust module 214 may be further configured to exclude any corporate structure designator that appears after a delimiter from the matching. For example, designators such as "Corp.", "LLC", "Inc." are excluded from the matching. The trust module 214 may obtain the legal business name from the digital image of the business paper via OCR. Once a probable match is determined, the trust module 214 may assign a trusted business number status tag to the corresponding telephone number in the caller ID information. The trusted business number status tag may trigger the caller ID server 114 to provide a trusted business caller indicator to a user device for display with an incoming call notification at a recipient user device for an incoming call made via the telephone number.

In some instances, the subscriber may update the caller ID information (e.g., update a business name) via the web portal 122 prior to submitting a government-issued ID. Accordingly, assuming that the result indicates that the government-issued ID is valid, the trust module 214 may perform a comparison of the legal business name in the business document to the updated business name submitted by the subscriber to determine whether there is a probable match. Once a probable match is determined, the trust module 214 may assign a trusted business number status tag to the corresponding telephone number in the caller ID information.

In some embodiments, the trust module 214 may distribute the trusted caller ID information to servers of social media sites that maintain online social media contact directories via the network 126. In other embodiments, the caller ID verification platform 112 may be configured to distribute the trusted caller ID information to the caller ID servers of other wireless carrier networks via the network 126.

The classification module 216 may analyze a call pattern associated with a telephone number of a subscriber via a machine-learning classifier 128 to classify the subscriber into a subscriber classification category. For example, the subscriber classification category may be one of business caller, part-time worker caller, student caller, stay-at-home caller, etc. In some embodiments, the machine-learning classifier 128 may use a machine-learning model 222 that is trained via a model training algorithm. The model training algorithm may implement a training data input phase, a feature engineering phase, and a model generation phase. In the training data input phase, the model training algorithm may receive training data. For example, each of the individual training datasets in the training data may include historical call patterns of subscribers that are labeled with subscriber classification categories. Each of the call patterns may include information on outgoing calls and/or incoming calls made by a corresponding subscriber during a predetermined time period. Such information may include times and dates of the calls, call duration of the calls, the telephone numbers of the outgoing and/or incoming calls, the geographical region associated with the outgoing and/or incoming calls, and/or so forth. During the feature engineering phase, the model training algorithm may pinpoint features in the training data. Accordingly, feature engineering may be used by the model training algorithm to figure out the significant properties and relationships of the input datasets that aid a machine-learning model 222 to distinguish between different classes of data. During the model generation phase, the model training algorithm may select an initial type of machine-learning algorithm to train the machine-learning model 222 using the training data. Following the application of a selected machine-learning algorithm to the training data, the model training algorithm may determine a training error measurement of the machine-learning model 222. If the training error measurement exceeds a training error threshold, the model training algorithm may use a rule engine to select a different type of machine-learning algorithm based on a magnitude of the training error measurement. The different types of machine-learning algorithms may include a Bayesian algorithm, a decision tree algorithm, a support vector machine (SVM) algorithm, an ensemble of trees algorithm (e.g., random forests and gradient-boosted trees), an artificial neural network, and/or so forth. The training process is generally repeated until the training results fall below the training error threshold and the trained machine-learning model is generated.

By using the trained machine-learning model 222, the classification module 216 may classify a subscriber into a subscriber classification category based on a call pattern of the subscriber during a predetermined time period. Following the classification of a particular subscriber into a subscriber classification category, the classification module 216 may further determine whether the particular subscriber classification category corresponds to a service plan type of the wireless service plan associated with the telephone number. If there is a lack of correspondence, the classification module 216 may prompt the BSS of the wireless carrier network 102 to send an offer of a more suitable wireless service plan to the particular subscriber. For example, if a call pattern shows that a telephone number with an individual plan is used by a subscriber who is actually a business caller, the BSS may offer a business service plan to the subscriber. In some embodiments, the classification module 216 may prompt the BSS to terminate the wireless service plan of the subscriber when the subscriber fails to sign up for the wireless service plan that corresponds to the subscriber classification category in a predetermined time period.

Additionally, the classification module 216 may assign a caller category label to individual telephone numbers that reflect the corresponding subscriber classification categories of the subscribers associated with the telephone numbers. In this way, a caller category label may be presented as a part of the caller ID information for a telephone number during an incoming call notification for a telephone call that is made via the telephone number. For example, the caller category label may show that an incoming call that appears to be from an individual may be possibly from a business, or vice versa.

In some embodiments, the classification module 216 may also determine whether the volume of telephone calls in a call pattern of a telephone number during a particular time period exceeds a volume threshold. If the volume of the telephone calls exceeds the volume threshold, the classification module 216 may determine that the corresponding subscriber is a high-volume caller. Such a determination may trigger the classification module 216 to generate a work order for customer service personnel of the wireless carrier network 102 to manually verify the caller ID information of the caller associated with the telephone number when no manual verification was performed during the particular time period or a longer predetermined time period that includes the particular time period. For example, the classification module 216 may trigger a customer service platform of the wireless carrier network 102 to generate the work order for a customer service representative to perform the verification. The verification may include requesting that the subscriber verifying the accuracy of the personal name or a business name in the caller ID information by providing a digital copy of a government-issued ID or a government-issued business paper, respectively.

Example Incoming Call Screens

Figure 3:
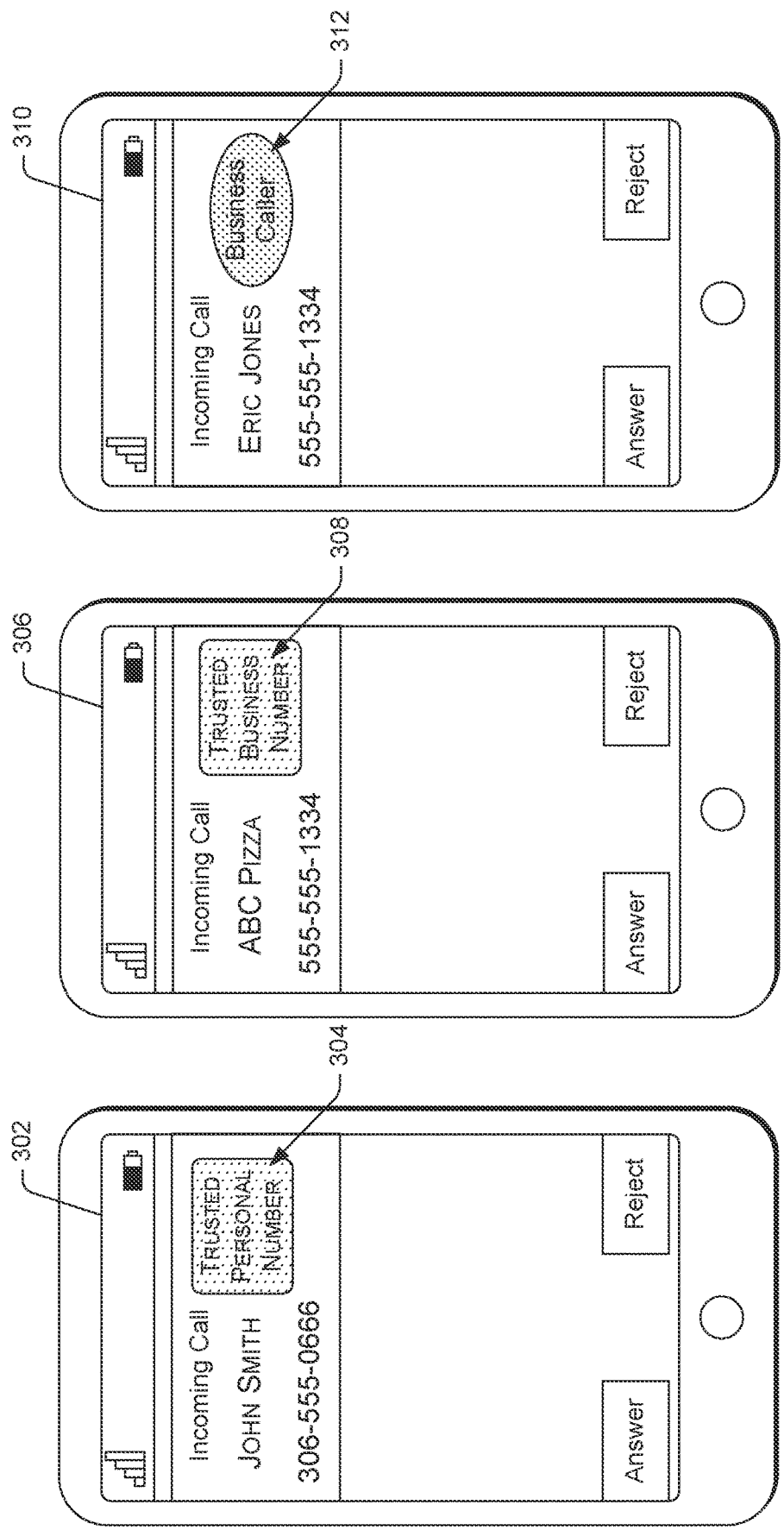
FIG. 3 shows example incoming call screens of a user device that displays multiple indicators that enable a subscriber to make a more informed choice as to whether to answer an incoming call.

FIG. 3 shows example incoming call screens of a user device that displays multiple indicators that enable a subscriber to make a more informed choice as to whether to answer an incoming call. An example incoming call screen 302 may present a trusted personal number indicator 304 as a part of an incoming call notification for an incoming call from a caller. The incoming call screen 302 may present other caller ID information, such as the name of the caller, the telephone number of the caller, and/or so forth. In various embodiments, the trusted personal number indicator 304 may be presented via a corresponding color, a corresponding icon, corresponding text information, a corresponding ring tone, or any combination of two or more of these elements.

In another example, an incoming call screen 306 may present a trusted business number indicator 308 as a part of an incoming call notification for an incoming call from a caller. The incoming call screen 306 may present other caller ID information, such as the name of the caller, the telephone number of the caller, and/or so forth. In various embodiments, the trusted personal number indicator 308 may be presented via a corresponding color, a corresponding icon, corresponding text information, a corresponding ring tone, or any combination of two or more of these elements.

In an additional example, an incoming call screen 310 may present a caller category label 312 as a part of an incoming call notification for an incoming call from a caller. The caller category label may correspond to a subscriber classification category of the caller that is assigned by the caller ID verification platform 112 of the wireless carrier network 102. The incoming call screen 310 may present other caller ID information, such as the name of the caller, the telephone number of the caller, and/or so forth. In various embodiments, the caller category label 312 may be presented via a corresponding color, a corresponding icon, corresponding text information, a corresponding ring tone, or any combination of two or more of these elements.

Example Processes

FIGS. 4-8 present illustrative processes 400-800 for using multiple sources of information to update a caller ID database of the wireless carrier network. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
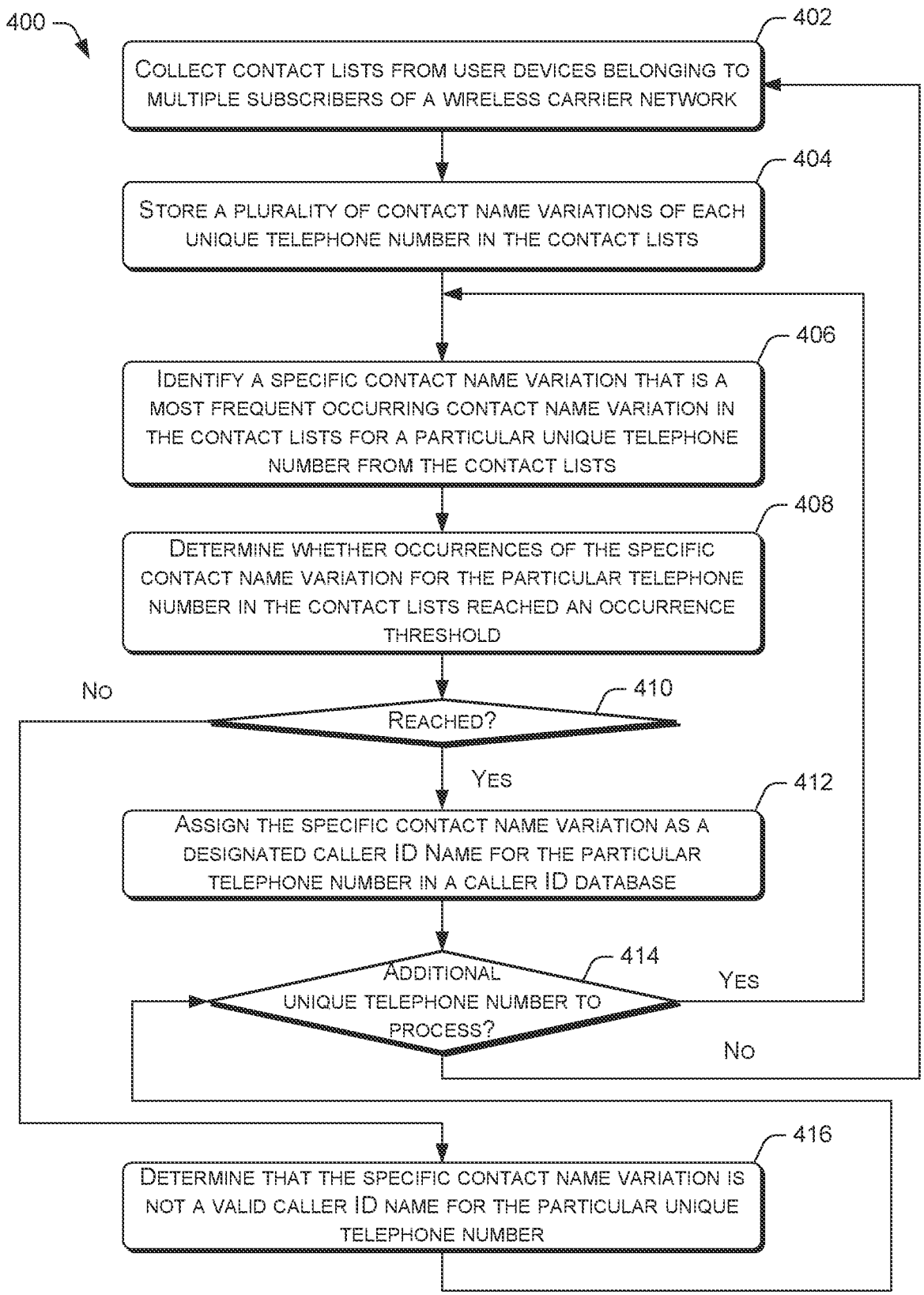
FIG. 4 is a flow diagram of an example process for updating a caller ID database of a wireless carrier network based on an occurrence frequency of a contact name variation for a telephone number in the contact lists of multiple user devices.

FIG. 4 is a flow diagram of an example process 400 for updating a caller ID database of a wireless carrier network based on an occurrence frequency of a contact name variation for a telephone number in the contact lists of multiple user devices. At block 402, the caller ID verification platform 112 may collect contact lists from user devices belonging to multiple subscribers of the wireless carrier network 102. For example, the caller ID verification platform 112 may collect the contact lists from a large sample size of user devices (e.g., hundreds of thousands of user devices) whose corresponding subscribers have consented to the data collection. At block 404, the caller ID verification platform 112 may store a plurality of contact name variations of each unique telephone number in the contact lists. For example, the caller ID verification platform 112 may collate and store the contact name variations for each unique telephone number that are found in the contact lists.

At block 406, the caller ID verification platform 112 may identify a specific contact name variation that is a most frequently occurring contact name variation in the contact lists for a particular unique telephone number from the contact lists. At block 408, the caller ID verification platform 112 may determine whether the occurrence of the specific contact name variation for the particular telephone number in the contact reached an occurrence threshold. For example, the occurrence threshold may be a minimum percentage threshold, such as 50%, 75%, 80%, etc. of the total contact lists.

At decision block 410, if the occurrence of the specific contact name variation reaches the occurrence threshold ("yes" at decision block 410), the process 400 may proceed to block 412. At block 412, the caller ID verification platform 112 may assign the specific contact name variation as a designated caller ID name for the particular telephone number in a caller ID database. At decision block 414, the caller ID verification platform 112 may determine whether there is at least one additional unique telephone number to process. Accordingly, if there is at least one additional unique telephone number to process ("yes" at decision block 414), the process 400 may loop back to block 404 so that another unique telephone number from the contact lists may be processed. However, if there are no additional unique telephone numbers to process ("no" at decision block 414), the process 400 may loop back to block 402.

Returning to decision block 410, if the occurrence of the specific contact name variation did not reach the occurrence threshold ("no" at decision block 410), the process 400 may proceed to block 416. At block 416, the caller ID verification platform 112 may determine that the specific contact name variation is a valid caller ID name for the particular unique telephone number. Subsequently, the process 400 may proceed to decision block 414.

Figure 5:
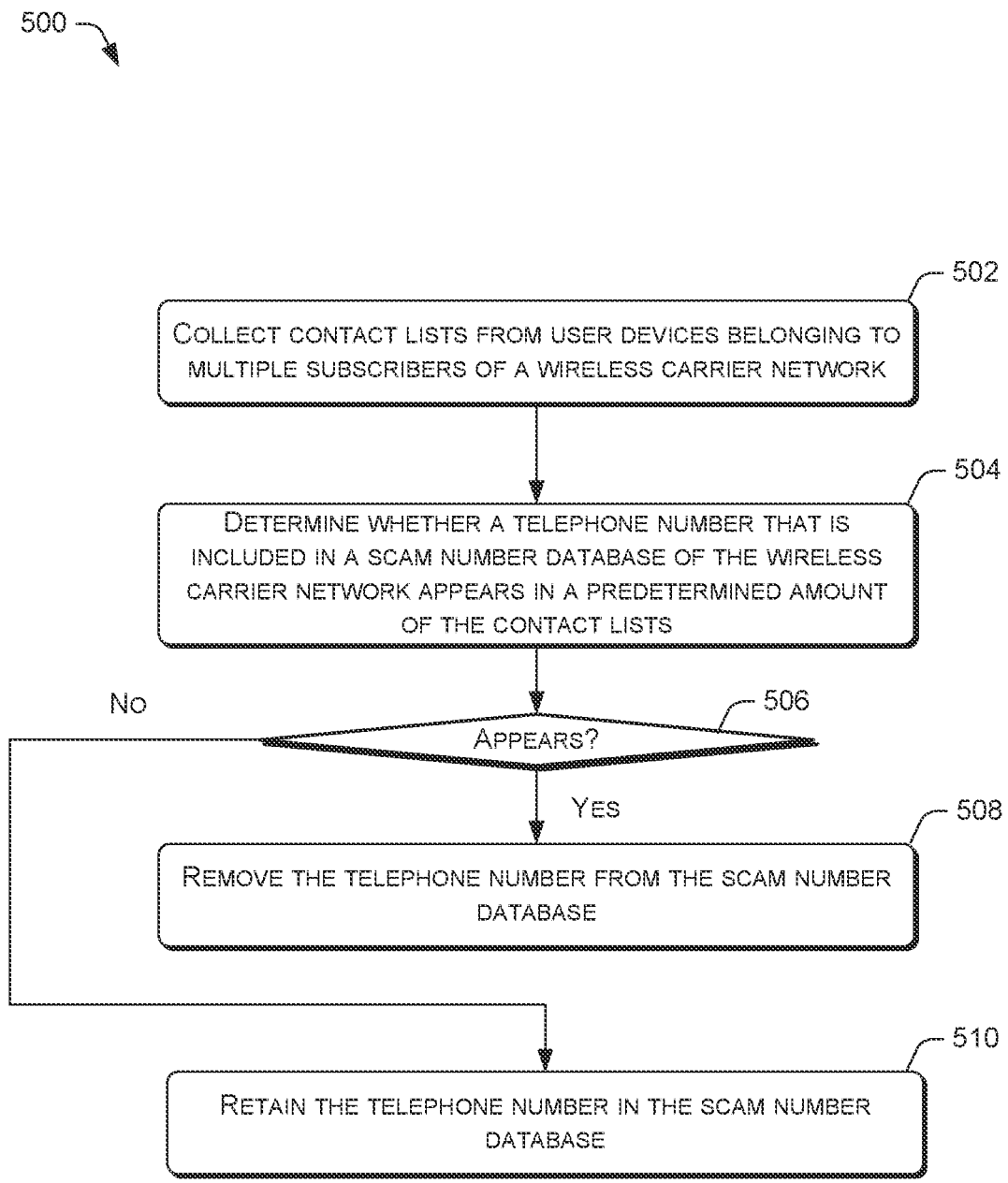
FIG. 5 is a flow diagram of an example process for removing a telephone number from a scam number database of a wireless carrier network based on occurrences of a contact name corresponding to the telephone number in the contact lists of multiple user devices.

FIG. 5 is a flow diagram of an example process 500 for removing a telephone number from a scam number database of a wireless carrier network based on occurrences of a contact name corresponding to the telephone number in the contact lists of multiple user devices. At block 502, the caller ID verification platform 112 may collect contact lists from user devices belonging to multiple subscribers of the wireless carrier network 102. At block 504, the caller ID verification platform 112 may determine whether a telephone number that is included in a scam number database appears in a predetermined amount of the contact lists. The predetermined amount may be a minimum percentage threshold (e.g., 80% of the contact lists collected from individual user devices) or a minimum numerical threshold (e.g., at least 50,000 contact lists collected from individual user devices).

At decision block 506, if the caller ID verification platform 112 determines that the telephone number has appeared in a predetermined amount of contact lists ("yes" at decision block 506), the process 500 may proceed to block 508. At block 508, the caller ID verification platform 112 may remove the telephone number from the scam number database. The scam number database may include a collection of telephone numbers that a scam protection algorithm of the caller ID verification platform 112 has determined to be associated with scam activity. Returning to decision block 506, if the caller ID verification platform 112 determines that the telephone number did not appear in the predetermined amount of contact lists ("no" at decision block 506), the process 500 may proceed to block 510. At block 510, the caller ID verification platform 112 may retain the telephone number in the scam number database.

Figure 6:
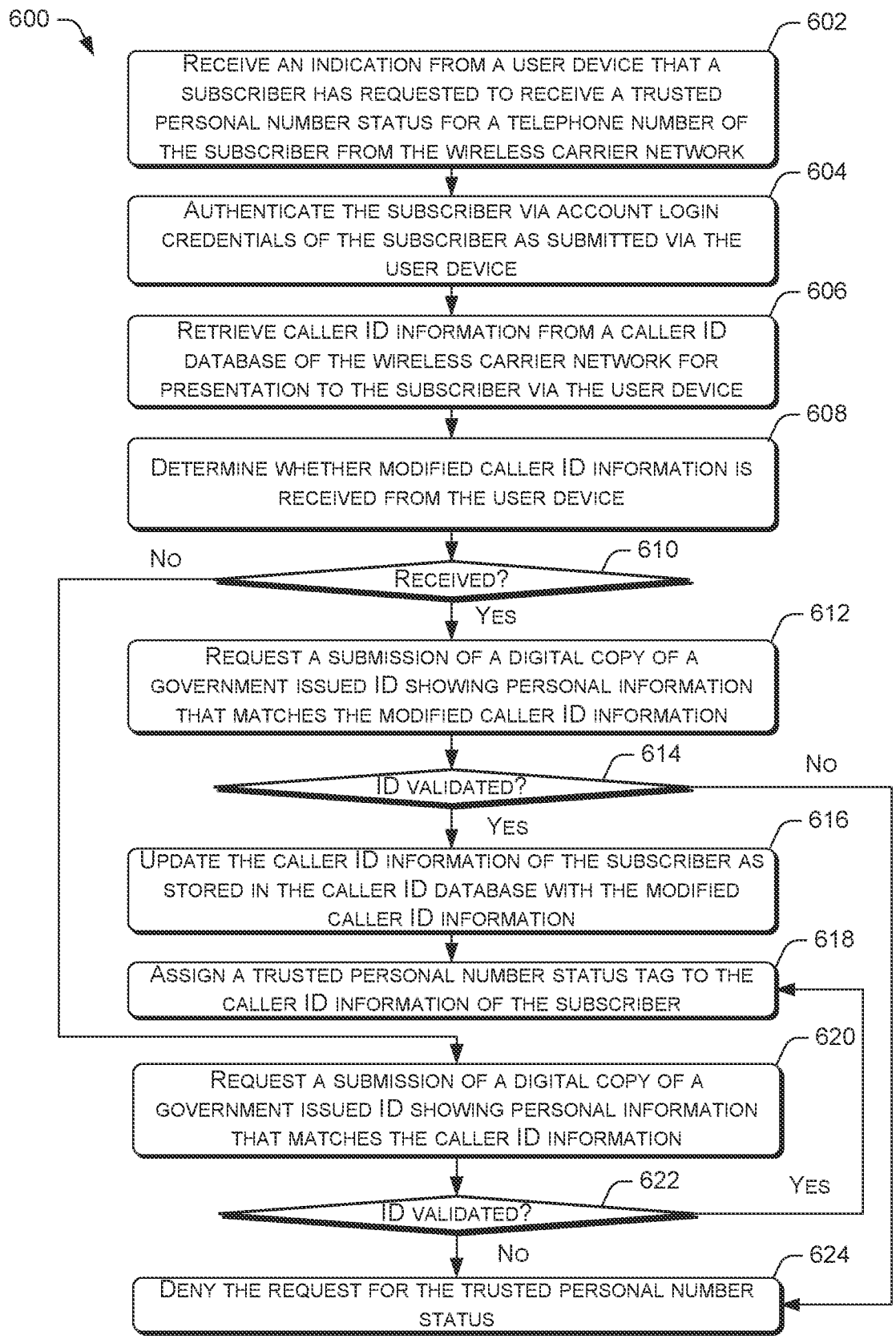
FIG. 6 is a flow diagram of an example process for assigning a trusted personal number status to a telephone number belonging to a subscriber of the wireless carrier network.

FIG. 6 is a flow diagram of an example process 600 for assigning a trusted personal number status to a telephone number belonging to a subscriber of the wireless carrier network. At block 602, the caller ID verification platform 112 of the wireless carrier network 102 may receive an indication from a user device that a subscriber has requested to receive a trusted personal number status for a telephone number of the subscriber. For example, the request may be received via a web portal, such as the web portal 122, that is provided by the caller ID verification platform 112.

At block 604, the caller ID verification platform 112 may authenticate the subscriber via account login credentials of the subscriber as submitted via the user device. In various embodiments, the account login credentials may include a login name, a password, biometric data, and/or so forth. At block 606, the caller ID verification platform 112 may retrieve caller ID information from a caller ID database of the wireless carrier network 102 for presentation to the subscriber via the user device. At block 608, the caller ID verification platform 112 may determine whether modified caller ID information is received from the user device. At decision block 610, if the caller ID verification platform 112 determines that modified caller ID information is received ("yes" at decision block 610), the process 600 may proceed to block 612.

At block 612, the caller ID verification platform 112 may request a submission of a digital copy of a government-issued ID showing personal information that matches the modified caller ID information. In various embodiments, the government-issued ID is required to be a photo ID that includes a portrait of the subscriber, the legal name of the subscriber, a residential address of the address, a date of birth for the subscriber, an age of the subscriber, physical attributes of the subscriber (e.g., height, weight, eye color, hair color), and/or so forth. At decision block 614, the caller ID verification platform 112 may determine whether the government-issued ID is validated. In various embodiments, the caller ID verification platform 112 may use a third-party validation platform 124 to perform a validation of the digital copy to determine the validity of the corresponding government-issued ID.

Accordingly, if the ID is validated ("yes" at decision block 614), the process 600 may proceed to block 616. At block 616, the caller ID verification platform 112 may update the caller ID information of the subscriber as stored in the caller ID database with the modified caller ID information. For example, the caller ID verification platform 112 may update a current caller ID name in the caller ID information with the modified caller ID name.

At block 618, the caller ID verification platform 112 may assign a trusted personal number status tag to the caller ID information of the subscriber. In various embodiments, the trusted personal number status tag may trigger the caller ID server 114 to provide a trusted personal caller indicator to a recipient user device for display with an incoming call notification by the user device for an incoming call made via the telephone number. Returning to decision block 614, if the ID is not validated ("no" at decision block 614), the process 600 may proceed to block 624. At block 624, the caller ID verification platform 112 may deny the request for the trusted personal number status.

Returning to decision block 610, if the caller ID verification platform 112 determines that no modified caller ID information is received ("no" at decision block 610), the process 600 may proceed to block 620. At block 620, the caller ID verification platform 112 may request a submission of a digital copy of a government-issued ID showing personal information that matches the caller ID information. At decision block 622, the caller ID verification platform 112 may determine whether the government-issued ID is validated. Accordingly, if the ID is validated ("yes" at decision block 622), the process 600 may proceed to block 618.

However, if the ID is not validated ("no" at decision block 622), the process 600 may proceed to block 624. At block 624, the caller ID verification platform 112 may deny the request for the trusted personal number status.

Figure 7:
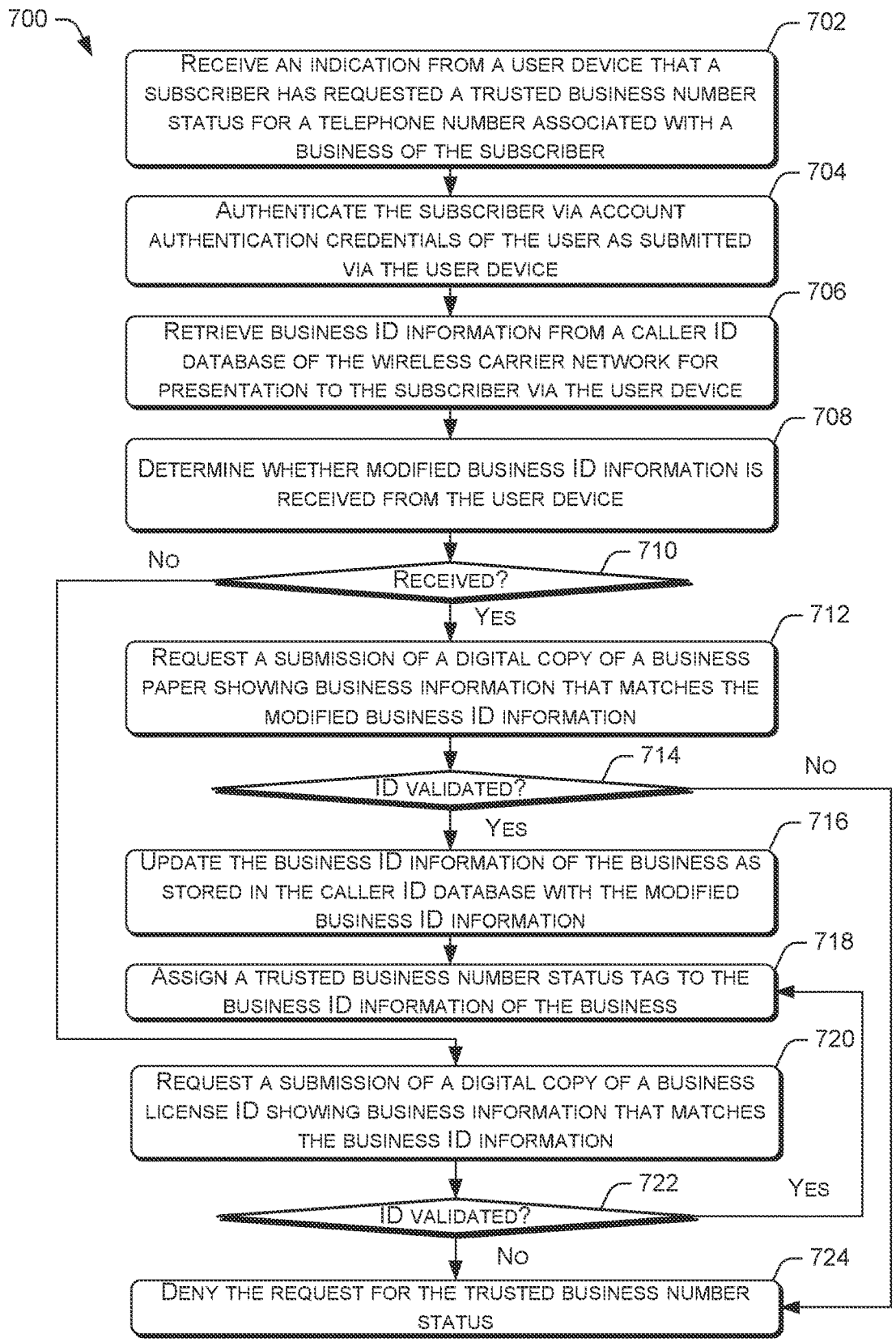
FIG. 7 is a flow diagram of an example process for assigning a trusted business number status to a telephone number belonging to a subscriber of the wireless carrier network.

FIG. 7 is a flow diagram of an example process 700 for assigning a trusted business number status to a telephone number belonging to a subscriber of the wireless carrier network. At block 702, the caller ID verification platform 112 of the wireless carrier network 102 may receive an indication from a user device that a subscriber has requested to receive a trusted business number status for a telephone number of the subscriber. For example, the request may be received via a web portal, such as the web portal 122, that is provided by the caller ID verification platform 112.

At block 704, the caller ID verification platform 112 may authenticate the subscriber via account login credentials of the subscriber as submitted via the user device. In various embodiments, the account login credentials may include a login name, a password, biometric data, and/or so forth. At block 706, the caller ID verification platform 112 may retrieve business ID information from a caller ID database of the wireless carrier network 102 for presentation to the subscriber via the user device. The business ID information includes a caller ID name that identifies a business name of a business. At block 708, the caller ID verification platform 112 may determine whether modified business ID information is received from the user device. At decision block 710, if the caller ID verification platform 112 determines that modified business ID information is received ("yes" at decision block 710), the process 700 may proceed to block 712.

At block 712, the caller ID verification platform 112 may request a submission of a digital copy of a government-issued business paper showing business information that matches the modified business ID information. For example, the government-issued business paper may be a business license, a business incorporation document, or some other official corporate document. The business paper may be required to include the legal business name of the business, a business address of the address, a description of the business, a document identifier, and/or so forth.

At decision block 714, the caller ID verification platform 112 may determine whether the government-issued business paper is validated. In various embodiments, the caller ID verification platform 112 may use a third-party validation platform 124 to perform a validation of the digital copy to determine the validity of the corresponding government-issued ID. Accordingly, if the business paper is validated ("yes" at decision block 714), the process 700 may proceed to block 716. At block 716, the caller ID verification platform 112 may update the business ID information of the subscriber as stored in the caller ID database with the modified business ID information. For example, the caller ID verification platform 112 may update a current business name in the business ID information with the modified business name. At block 718, the caller ID verification platform 112 may assign a trusted business number status tag to the business ID information of the subscriber. In various embodiments, the trusted business number status tag may trigger the caller ID server 114 to provide a trusted business caller indicator to a recipient user device for display with an incoming call notification by the user device for an incoming call made via the telephone number. Returning to decision block 714, if the business paper is not validated ("no" at decision block 714), the process 700 may proceed to block 724. At block 724, the caller ID verification platform 112 may deny the request for the trusted business number status.

Returning to decision block 710, if the caller ID verification platform 112 determines that no modified business ID information is received ("no" at decision block 710), the process 700 may proceed to block 720. At block 720, the caller ID verification platform 112 may request a submission of a digital copy of a government-issued business paper showing business information that matches the business ID information. At decision block 722, the caller ID verification platform 112 may determine whether the government-issued business paper is validated. Accordingly, if the business paper is validated ("yes" at decision block 722), the process 700 may proceed to block 718. However, if the business paper is not validated ("no" at decision block 722), the process 700 may proceed to block 724. At block 724, the caller ID verification platform 112 may deny the request for the trusted business number status.

Figure 8:
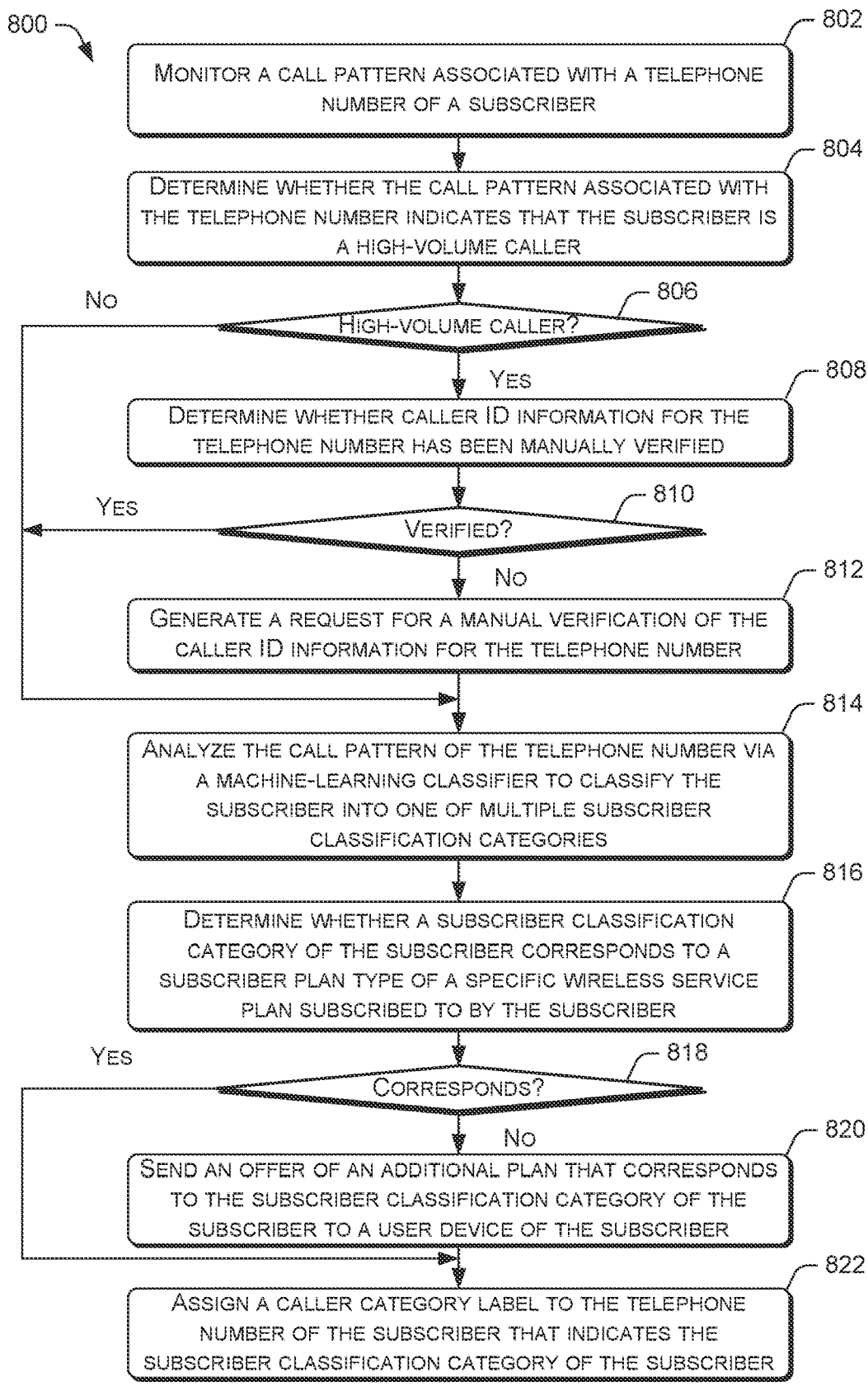
FIG. 8 is a flow diagram of an example process for assigning a caller category label to a telephone number belonging to a subscriber of the wireless carrier network based on a call pattern analysis of the telephone number.

FIG. 8 is a flow diagram of an example process 800 for assigning a caller category label to a telephone number belonging to a subscriber of the wireless carrier network based on a call pattern analysis of the telephone number. At block 802, the caller ID verification platform 112 may monitor a call pattern associated with a telephone number of a subscriber. At block 804, the caller ID verification platform 112 may determine whether the call pattern associated with the telephone number indicates that the subscriber is a high-volume caller. In various embodiments, the caller ID verification platform 112 determines that the subscriber is a high-volume caller when the volume of telephone calls in a call pattern of a telephone number during a particular time period exceeds a volume threshold.

At decision block 806, if the caller ID verification platform 112 determines that the subscriber is a high-volume caller ("yes" at decision block 806), the process 800 may proceed to block 808. At block 808, the caller ID verification platform 112 may determine whether caller ID information for the telephone number has been manually verified. For example, the caller ID verification platform 112 may determine that the telephone number was not manually verified if no manual verification was performed during a predetermined time period or a longer predetermined time period that includes the particular time period. At decision block 810, if the caller ID information has not been manually verified ("no" at decision block 810), the process 800 may proceed to block 812. At block 812, the caller ID verification platform 112 may generate a request for a manual verification of the caller ID information for the telephone number. For example, the caller ID verification platform 112 may trigger a customer service platform of the wireless carrier network 102 to generate the work order for a customer service representative to perform the verification. Subsequently, the process 800 may proceed to block 814. However, if the caller information has been manually verified ("yes" at decision block 810), the process 800 may proceed directly to block 814.

At block 814, the caller ID verification platform 112 may analyze the call pattern of the telephone number via a machine-learning classifier to classify the subscriber into one of multiple subscriber classification categories. In various embodiments, the subscriber classification category may be one of business caller, part-time worker caller, student caller, stay-at-home caller, etc. At block 816, the caller ID verification platform 112 may determine whether a subscriber classification category of the subscriber corresponds to a service plan type of a specific wireless service plan subscribed to by the subscriber for the telephone number. At decision block 818, if the subscriber classification category of the subscriber does not correspond to the service plan type ("no" at decision block 818), the process 800 may proceed to block 820. At block 820, the caller ID verification platform 112 may send an offer of an additional plan that corresponds to the subscriber classification category of the subscriber to a user device of the subscriber. At block 822, the caller ID verification platform 112 may assign a caller category label to the telephone number of the subscriber that indicates the subscriber classification category of the subscriber.

Returning to decision block 818, if the subscriber classification category of the subscriber corresponds to the service plan type ("yes" at decision block 818), the process 800 may proceed directly to block 824. Returning to decision block 806, if the caller ID verification platform 112 determines that the subscriber is not a high-volume caller ("not" at decision block 806), the process 800 may proceed directly to block 814.

The use of multiple sources of information to verify the accuracy of caller ID information, as well as the inclusion of additional indicators and labels in the caller ID information, may help users to make a more informed choice as to whether to answer an incoming call. Such verified caller ID information may also help users to avoid answering unwanted solicitation calls or scam calls. Additionally, such verified caller ID information may also prevent some subscribers from being erroneously labeled with inaccurate information that affect their ability to reach call recipients. Thus, the use of multiple sources of information to verify caller ID information accuracy may increase overall subscriber satisfaction with an MNO that operates the wireless carrier network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    monitoring a call pattern associated with a telephone number of a subscriber of a wireless carrier network;
    analyzing the call pattern via a machine-learning algorithm to classify the subscriber into a subscriber classification category of multiple subscriber classification categories;
    determining whether the subscriber classification category of the subscriber corresponds to a service plan type of a specific wireless service plan subscribed to by the subscriber for the telephone number;
    in response to the subscriber classification category failing to correspond to the service plan type, sending an offer of an additional wireless service plan that corresponds to the subscriber classification category of the subscriber to a user device of the subscriber; and
    in response to the subscriber classification category corresponding to the service plan type, assigning a caller category label to the subscriber that indicates the subscriber classification category of the subscriber.

2. The one or more non-transitory computer-readable media of claim 1, wherein the acts further comprise:
    determining whether a caller ID name for the telephone number has been manually verified when the call pattern indicates that the subscriber is a high-volume wireless service user; and
    in response to determining that the telephone number has not been manually verified, generating a request for a manual verification of the caller ID name for the telephone number.

3. The one or more non-transitory computer-readable media of claim 1, wherein the acts further comprise assigning the caller category label to the subscriber following the sending the offer of the additional wireless service plan that corresponds to the subscriber classification category of the subscriber to the user device of the subscriber.

4. The one or more non-transitory computer-readable media of claim 1, wherein the acts further comprise providing caller ID information that includes the caller category label for a telephone call that is initiated from a user device of the subscriber via the telephone number.

5. The one or more non-transitory computer-readable media of claim 1, wherein the acts further terminate the wireless service plan when the subscriber fails to sign up for the additional wireless service plan that corresponds to the subscriber classification category in a predetermined time period.

6. The one or more non-transitory computer-readable media of claim 1, wherein the subscriber classification categories include at least one of business caller, part-time worker caller, student caller, or stay-at-home caller.

7. A system, comprising:
    one or more processors; and
    memory including a plurality of computer-executable components that are executable by the one or more processors to perform a plurality of actions, the plurality of actions comprising:
    collecting contact lists from user devices belonging to multiple subscribers of a wireless carrier network;
    storing a plurality of contact name variations of each unique telephone number in the contact lists; and
    determining whether a specific contact name variation is a most frequent occurring contact name variation in the contact lists for a particular telephone number of a subscriber;
    in response to the specific contact name variation being the most frequent occurring contact name variation, assigning the specific contact name variation as a designated caller ID name for the particular telephone number in a caller ID database; and
    in response to the specific contact name variation not being the most frequent occurring contact name variation, making a determination that the specific contact name variation is not a valid caller ID name for the particular telephone number.

8. The system of claim 7, wherein the plurality of actions further comprise providing caller ID information that includes the designated caller ID name for a telephone call that is initiated from a user device of the subscriber via the particular telephone number.

9. The system of claim 7, wherein the assigning includes assigning the specific contact name variation as the designated caller ID name when occurrences of the specific contact name variation for the particular telephone number reaches an occurrence threshold in the contact lists.

10. The system of claim 7, wherein the specific contact name variation includes at least one of a first name or a last name.

11. The system of claim 7, wherein the plurality of actions further comprise:
  determining whether a telephone number that is included in a scam number database of the wireless carrier network appears in a predetermined amount of the contact lists;
  in response to the telephone number appearing in the predetermined amount of the contact lists, removing the telephone number from the scam number database; and
  in response to the telephone number failing to appear in the predetermined amount of the contact lists, retaining the telephone number in the scam number database.

12. The system of claim 7, wherein the plurality of actions further comprise:
  monitoring a call pattern associated with the particular telephone number of the subscriber;
  analyzing the call pattern via a machine-learning algorithm to classify the subscriber into a subscriber classification category of multiple subscriber classification categories;
  determining whether the subscriber classification category of the subscriber corresponds to a service plan type of a specific wireless service plan subscribed to by the subscriber for the particular telephone number;
  in response to the subscriber classification category failing to correspond to the service plan type, sending an offer of an additional wireless service plan that corresponds to the subscriber classification category of the subscriber to a user device of the subscriber; and
  in response to the subscriber classification category corresponding to the service plan type, assigning a caller category label to the subscriber that indicates the subscriber classification category of the subscriber.

13. A computer-implemented method, comprising:
  receiving an indication from a user device that a subscriber has requested a trusted business number status for a telephone number associated with a business of the subscriber;
  retrieving business identification (ID) information of the business from a caller ID database of a wireless carrier network for presentation to the subscriber via the user device;
  determining whether modified business ID information is received from the user device following a presentation of the business ID information on the user device; and
  in response to determining that the modified business ID information is received, requesting a submission of a digital copy of a government-issued business paper showing business information that matches the modified business ID information, updating the business ID information of the business with the modified business ID information following authentication of the digital copy of the business paper, and assigning a trusted business number status tag to the business ID information of the business.

14. The computer-implemented method of claim 13, wherein the trusted business number status tag triggers a caller ID server to provide a trusted business caller indicator for display with an incoming call notification at a recipient user device when a telephone call to the recipient user device is initiated via the telephone number.

15. The computer-implemented method of claim 13, further comprising in response to determining that no modified business ID information is received, requesting a submission of a digital copy of a business paper showing business information that matches the business ID information, and assigning the trusted business number status tag to the business ID information of the business following the authentication of the digital copy of the business paper.

16. The computer-implemented method of claim 15, further comprising distributing business ID information or modified business ID information that includes the telephone number to at least one of an online social media site or an additional wireless carrier network.

17. The computer-implemented method of claim 13, further comprising:
  receiving an indication from a user device that a subscriber has requested a trusted personal number status for an additional telephone number of the subscriber;
  retrieving caller ID information of the subscriber from a caller ID database of the wireless carrier network for presentation to the subscriber via the user device;
  determining whether modified caller ID information is received from the user device following a presentation of the caller ID information on the user device; and
  in response to determining that the modified caller ID information is received, requesting a submission of a digital copy of a government-issued ID showing personal information that matches the modified caller ID information, updating the caller ID information of the subscriber with the modified caller ID information following authentication of the digital copy of the government-issued ID, and assigning a trusted personal number status tag to the caller ID information of the subscriber.

18. The computer-implemented method of claim 17, wherein the trusted personal number status tag triggers a caller ID server to provide a trusted personal caller indicator for display with an incoming call notification at a recipient user device when a telephone call to the recipient user device is initiated via the additional telephone number.

19. The computer-implemented method of claim 17, further comprising in response to determining that no modified caller ID information is received, requesting a submission of a digital copy of a government-issued ID showing personal information that matches the caller ID information, and assigning the trusted personal number status tag to the caller ID information of the subscriber following the authentication of the digital copy of the government-issued ID.

20. The computer-implemented method of claim 19, further comprising distributing caller ID information or modified caller ID information that includes the additional telephone number to at least one of an online social media site or an additional wireless carrier network.

* * * * *